May 17, 1938.  F. G. G. ARMSTRONG  2,117,646
HYDRAULIC SHOCK ABSORBER AND THE LIKE DAMPING MEANS
Filed Oct. 16, 1936    2 Sheets-Sheet 2
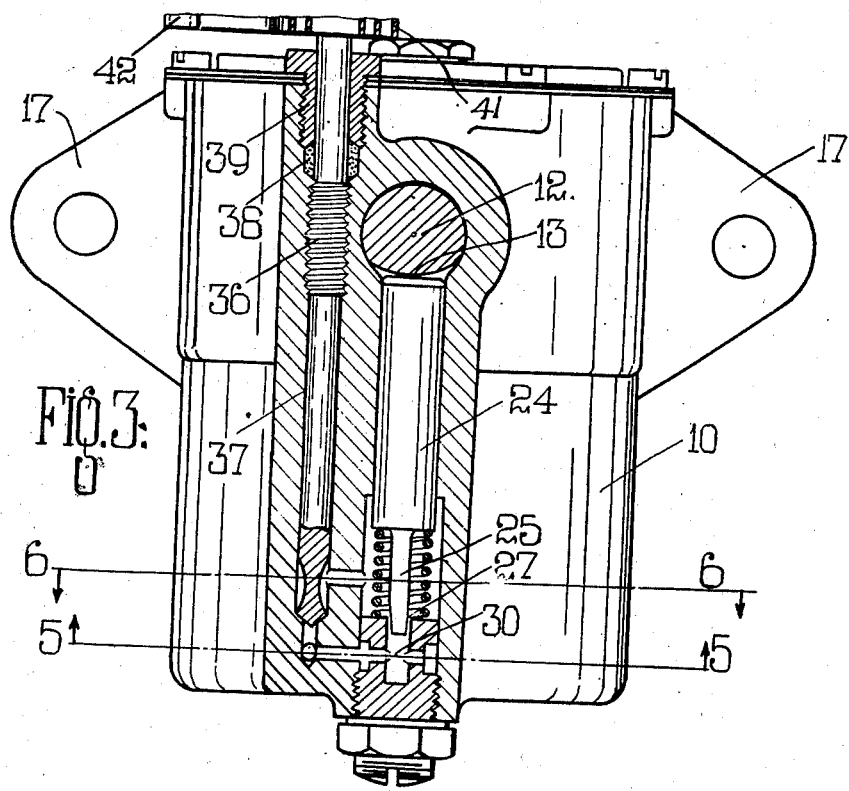
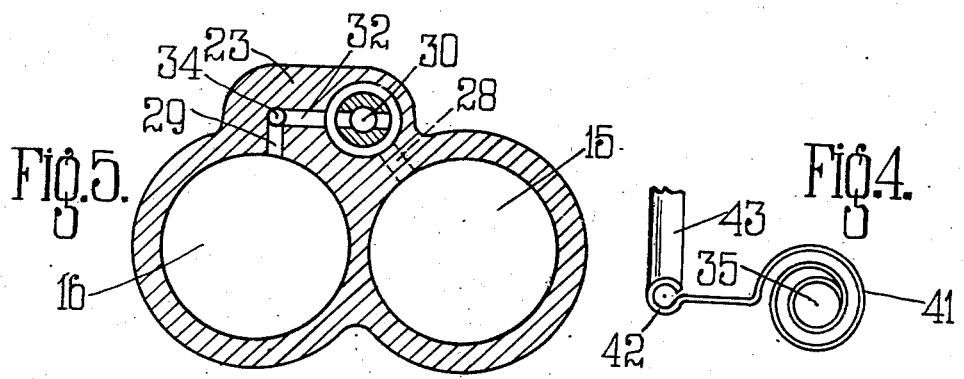
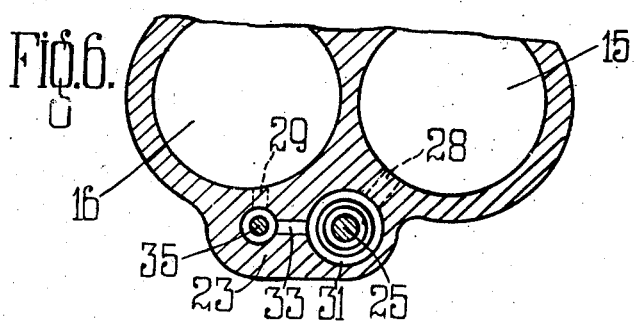
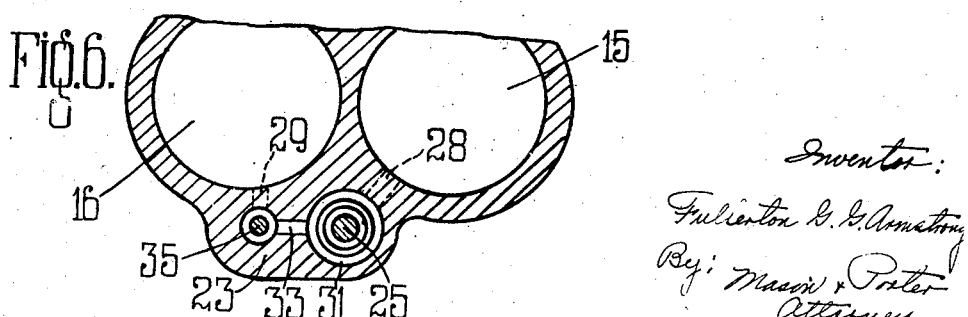
Inventor:
Fullerton G. G. Armstrong
By: Mason & Porter
Attorneys Patented May 17, 1938

2,117,646

UNITED STATES PATENT OFFICE 2,117,646

HYDRAULIC SHOCK ABSORBER AND THE LIKE DAMPING MEANS

Fullerton George Gordon Armstrong, Beverley, England, assignor to Armstrong's Patents Company Limited, Beverley, East Yorkshire, England Application October 16, 1936, Serial No. 106,062
In Great Britain August 8, 1936

3 Claims. (Cl. 188—88)

The present invention relates to hydraulic shock absorbers and the like differential pressure operated damping means of the type wherein one or more restricted passages form a resistance to fluid flow in both directions between a pair of piston chambers such as, for example, between the ends of a cylinder in which a double acting piston operates, or again between a pair of cylinders in each of which a piston is displaceable on operation of the shock absorber or further, in the rotary or vane type of shock absorber.

In shock absorbers of the kind mentioned, the object of the present invention is to provide a variable resistance to fluid flow in both directions at the will of the operator independently of an initial predetermined adjustment and a variable adjustment consistent with the relative degree of displacement of the elements whose movements are to be damped by the shock absorber.

According to the present invention an additional passage or bypass is provided for fluid flow on displacement of the shock absorber parts which passage is controlled by a displaceable valve so as to vary the setting of the parts to suit particular requirements.

Thus, when a relatively hard setting is required, that is to say it is desired to form a relatively large resistance to fluid flow on displacement of the shock absorber parts, the bypass is closed to a greater extent than when a relatively soft setting permitting freer displacement of the shock absorber parts is needed.

The bypass may be controlled in any one, or any combination, of a number of ways including firstly a remote control such as, for example, a control in the region of the driver's seat to effect a predetermined fixed adjustment for the cross sectional area of the bypass. A second control may be thermostatically operated in which case the area available to fluid flow along the bypass is automatically adjusted with variation of temperature either of the outside atmosphere or preferably the temperature of the fluid, such as oil within the shock absorber.

The invention is more particularly described with reference to the accompanying drawings, in which:—

Figure 3 is an elevational view of the shock absorber of Figure 1 but showing a modified form of control for the bypass.

Figure 4 is a plan view of the control for Figure 3.

Figure 5 is a section on the line 5—5 of Figure 3.

Figure 6 is a section on the line 6—6 of Figure 3.

Figure 1:
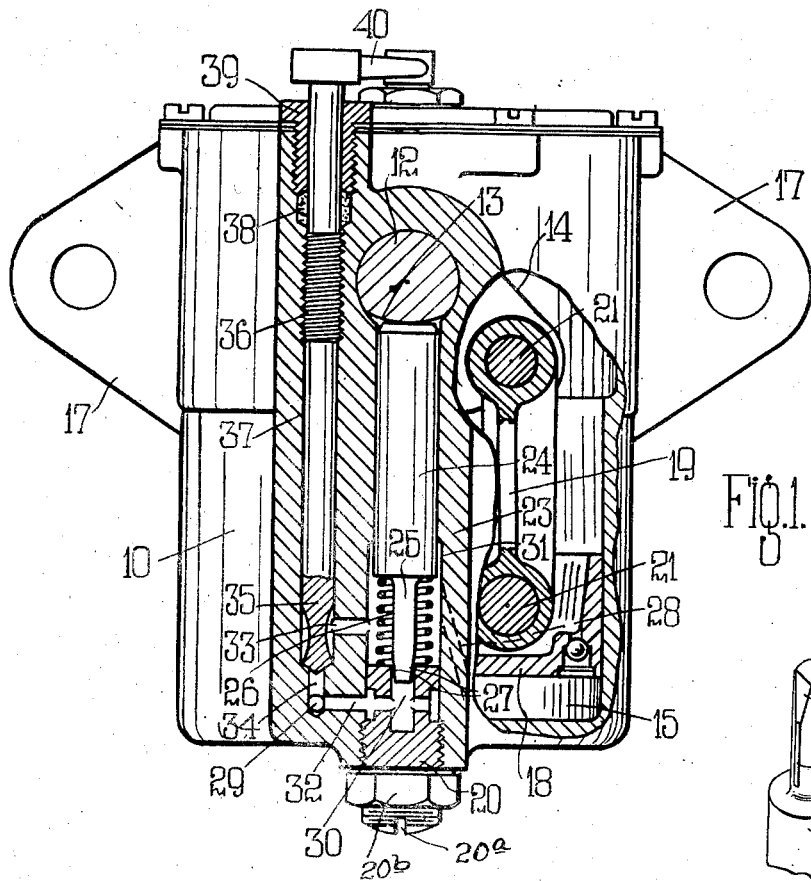
Figure 1 is a vertical sectional view through a shock absorber of the double cylinder type with the bypass shown in cross section and with one of the cylinders only shown in fragmentary view.
Figure 7:
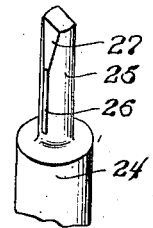
Figure 7 is a detailed view of the needle valve.

In the construction according to the drawings a shock absorber casing 10 adapted for connection to the chassis of a motor or other vehicle through brackets 17 whilst the lever 11 adapted for link connection with an axle of the vehicle on which the shock absorber is mounted, is rigid with a shaft 12 which has a cam face 13 thereon and carries a crank 14 pivoted about the axis of the shaft and angularly displaceable with said shaft. A pair of cylinders 15, 16, are formed in the casing, whilst pistons 18, only one of which is shown, are longitudinally displaceable in said cylinders by virtue of link connections 19 with the ends of the crank 14, the movement of the pistons being such that one is on its downward stroke when the other moves upwardly on angular rotation of the crank 14 in the shaft 12 about the axis of the shaft. For this purpose the links 19 are pivoted at their ends both to the pistons and to the crank at 21, 22, respectively.

A boss 23 extending longitudinally of the casing is initially bored at 31 to receive a tapered needle valve which comprises a spindle 24, a relatively thin shank 25, which has opposed flat surfaces 26 and tapered flat faces 27 at its free end. This tapered needle valve controls a pair of passages 28, 29, between the bore 31 and the cylinders 15, 16, respectively, and is longitudinally displaceable relatively to the bore 31 in strict accordance with the angular displacement of the cam face 13 on the shaft 12 to vary the cross sectional area of a port 30 in which the free end of the valve is displaceable. The valve port 30 is formed in an externally adjustable screw threaded member 20 and lies in the path of fluid flow between the passages 28 and 29. In other words, the passage 29 is horizontal whilst the passage 28 is inclined upwardly from its cylinder to merge into the bore 31 above the seating of the valve port 30. The passage 29 is in communication with a conduit 32 which has access to the bore below the valve port 30. The flat surfaces 26 thus prevent complete closing of the valve port 30 and afford a needle valve wherein the maximum cross-sectional area is less than the cross-sectional area of the bore 30. The inner end of the threaded member 20 provides a valve seating and the portion thereof disposed externally of the casing is provided with a recess 20a by which it may be turned to adjust the valve seating. A lock nut 20b threadedly engages the member 20 and serves to lock the same in the adjusted position thereof.

A bypass or passage formed by conduits 33, 34, is provided to enable fluid to flow to and from the passages 28, 29 other than through the valve port 30, said bypass or additional passage being controlled by a tapered valve 35, the spindle of which is screw threaded at 36 for engagement with a screw threaded portion of a bore 37 within which the valve is located, the upper end of the valve spindle passing through a packing 38 and gland 39 to prevent leakage of the fluid through the upper end of the bore 37. The spindle of the valve 35 is angularly displaceable by a lever 40 to cause longitudinal displacement of the valve and thus vary the position of the valve on its seating at the top of the conduit 34.

Figure 2:
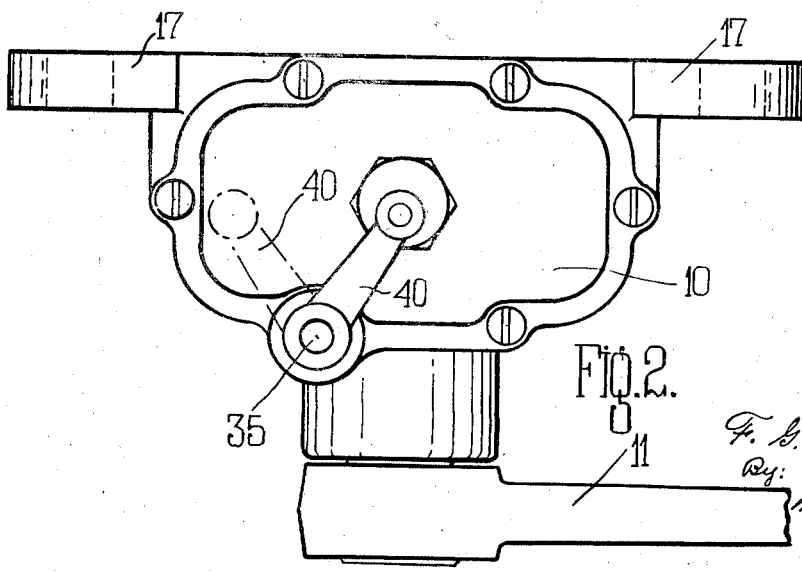
Figure 2 is a corresponding plan view.

Thus when the lever 40 is angularly displaced from its open position shown in chain dotted lines in Figure 2 to its closed position shown in full lines in said figure, and the valve 35 is displaced to a position where it remains firmly on its seat, the only passage for the fluid between the cylinders 15 and 16 of the shock absorber on reciprocation of the pistons is through the passage 29, the port 30 past the valve 35, into the bore 31 and through the passage 28 and in exactly the opposite direction on reversal of piston displacement.

When, however, the lever 40 is angularly displaced towards its open position the valve 35 is lifted by an amount dependent upon the degree of angular displacement of the lever 40 to allow a certain proportion of the fluid to flow upwardly past the valve 35 directly into the bore 31 without passing through the valve port 30. Thus the restriction to fluid flow, quite independently of the adjustment of the member 20 and the degree of angular displacement of the shaft 12, may be varied to give a harder or softer setting of the shock absorber by adjustment of the lever 40.

In the modified form of construction shown in Figures 3 and 4 the position of the valve 35 on its seating is varied automatically with variation in temperature in that the upper end of the valve spindle is connected to a thermostat in the form of a bi-metallic coiled spring 41, the convolutions of which vary with variation of temperature. If desired, the end 42 of the coiled spring, instead of being fixed may be connected by any suitable member 43 to a remote control which in the case of a vehicle may be situated in the region of the driver's seat.

It will thus be seen that three distinct controls may be utilized either separately or in any desired combination, one of them being a predetermined fixed control and the other two being automatic and dependent on different conditions existing during use.

I declare that what I claim is:—

1. Differential pressure operated damping means for a pair of relatively displaceable members, comprising a casing adapted to be connected to one of said members, a shaft connected to the other of said members, a pair of pistons displaceable on rotation of said shaft, a pair of cylinders within said casing and within which said pistons are displaceable, means providing a restricted passage between said cylinders through which the fluid is caused to flow on displacement of said pistons, a valve seating disposed in the restricted passage and adjustable externally of said casing, a tapered needle valve longitudinally displaceable with respect to said valve seating in accordance with angular rotation of said shaft, and being of a maximum cross-sectional area less than that of the bore in said valve seating, a by-pass in said casing connecting the restricted passage above and below said valve seating, and valve means for controlling said by-pass independently of the cross-sectional area of restricted passage therethrough said valve seating.

2. Differential operating pressure damping means, as claimed in claim 1, wherein remote control means are provided for shifting said valve means to vary area of said by-pass.

3. Differential pressure operated damping means, as claimed in claim 1, wherein thermostatic control means are provided for shifting said valve means to vary the cross-sectional area of said by-pass.

FULLERTON GEORGE
GORDON ARMSTRONG.